(12) United States Patent
Nieves et al.

(10) Patent No.: US 10,797,965 B2
(45) Date of Patent: Oct. 6, 2020

(54) DYNAMICALLY SELECTING OR CREATING A POLICY TO THROTTLE A PORTION OF TELEMETRY DATA

(71) Applicant: Dell Products L. P., Round Rock, TX (US)

(72) Inventors: Alberto Nieves, Cherry Hill, NJ (US); Aarthy Kidambi Sekar, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 176 days.

(21) Appl. No.: 16/048,653

(22) Filed: Jul. 30, 2018

(65) Prior Publication Data

US 2020/0036603 A1    Jan. 30, 2020

(51) Int. Cl.
| | |
|---|---|
| H04L 12/24 | (2006.01) |
| H04L 29/06 | (2006.01) |
| H04L 12/26 | (2006.01) |
| H04L 12/801 | (2013.01) |
| H04Q 9/00 | (2006.01) |

(52) U.S. Cl.
CPC ........ H04L 41/5025 (2013.01); H04L 43/065 (2013.01); H04L 43/08 (2013.01); H04L 47/12 (2013.01); H04L 63/0876 (2013.01); H04Q 9/00 (2013.01); H04Q 2209/10 (2013.01); H04Q 2209/70 (2013.01)

(58) Field of Classification Search
CPC ............. H04L 41/5025; H04L 63/0876; H04L 43/065; H04L 47/12; H04L 43/08; H04Q 9/00; H04Q 2209/70; H04Q 2209/10; H04Q 2209/82

USPC ........................................................ 709/224
See application file for complete search history.

(56) References Cited

U.S. PATENT DOCUMENTS

| | | | | |
|---|---|---|---|---|
| 2012/0278722 | A1* | 11/2012 | Raleigh | H04L 12/14 715/735 |
| 2014/0101301 | A1* | 4/2014 | Wanser | H04L 41/0816 709/224 |
| 2016/0050222 | A1* | 2/2016 | Iyer | H04L 63/1416 726/1 |
| 2016/0087854 | A1* | 3/2016 | Jayanti Venkata | H04L 41/20 709/224 |
| 2017/0187597 | A1* | 6/2017 | Nolan | H04L 43/065 |
| 2019/0174207 | A1* | 6/2019 | Cella | H04L 67/12 |
| 2019/0287004 | A1* | 9/2019 | Bhoj | H04L 67/22 |
| 2020/0036635 | A1* | 1/2020 | Ohuchi | H04L 12/66 |

* cited by examiner

Primary Examiner — Moustafa M Meky
Assistant Examiner — Elizabeth Kassa
(74) Attorney, Agent, or Firm — Campbell Stephenson LLP; Shiv S. Naimpally

(57) ABSTRACT

In some examples, a server may receive a set of events from individual computing devices of a plurality of computing devices. For example, the server may receive first data identifying a first set of events that occurred on a first computing device and receive second data identifying a second set of events that occurred on a second computing device. The server may determine an event rate at which events are being received based at least in part on: the first set of events, the second set of events, and a time interval. The server may perform an analysis of at least the first set of events and the second set of events, and create, based on the analysis, a policy to reduce the event rate. The server may provide the policy to at least the first computing device and the second computing device.

20 Claims, 7 Drawing Sheets

| Event Type 202 | Frequency 206 | Throttle 208 | Priority 210 | Description 212 |
|---|---|---|---|---|
| One time ping 214 | Low | No | Low | First time live in the field |
| Heartbeat 216 | Medium | Yes | Low | Sent at a predetermined interval |
| S/W Utilization 218 | Variable (Can be High) | Yes | Medium | Software application's use of software resources |
| H/W Utilization 220 | Variable (Can be High) | Yes | High | Software application's use of hadrware resources |

FIG. 2

| Policy 302 | Policy Type 304 | Trigger 306 | Description 308 |
|---|---|---|---|
| Low Throttling 310 | Preset Policy | 1st Threshold | A policy with rules to cause a small reduction in received event rate |
| Medium Throttling 312 | Preset Policy | 2nd Threshold | A policy with rules to cause a moderate reduction in received event rate |
| High Throttling 314 | Preset Policy | 3rd Threshold | A policy with rules to cause a large reduction in received event rate |
| Regional Routing 316 | Dynamic Policy | Policy Scoring & Burst Detection | Dynamic policy routes events to regional event processing locations |
| Adaptive Throttling 318 | Dynamic Policy | Policy Scoring & Burst Detection | Variable throttling of events to reduce received event rate |

DYNAMICALLY SELECTING OR CREATING A POLICY TO THROTTLE A PORTION OF TELEMETRY DATA

BACKGROUND OF THE INVENTION

Field of the Invention

This invention relates generally to computing devices and, more particularly to a server that receives telemetry data from multiple computing devices, where the telemetry data indicates the occurrence of various events on each computing device. If the rate at which the telemetry data exceeds the capacity of the server to process the telemetry data, the server may select or create a policy that instructs the multiple computing devices to throttle (e.g., stop sending now and send later) at least a portion of the telemetry data.

Description of the Related Art

As the value and use of information continues to increase, individuals and businesses seek additional ways to process and store information. One option available to users is information handling systems. An information handling system (HIS) generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

A computer manufacturer, such as, for example, Dell®, may install a software agent on each computing device (e.g., laptop, tablet, desktop, server, and the like) that is acquired (e.g., purchased or leased) before the computing device is shipped. The software agent may gather data, such as events (e.g., logs, crashes, restarts, and the like) associated with the computing device and periodically send the gathered data ("telemetry data") to one or more servers (e.g., cloud-based servers). The manufacturer may, for example, analyze the data to determine how users are using the computing devices.

In some cases, a bug in the software, hardware, firmware (or any combination thereof) of a computing device may cause the computing device to send significantly more (e.g., at least a pre-determined percentage, such as 20%, more) data than normal. If multiple computing devices have the same bug, then the multiple computing devices may send so much data that the servers are overwhelmed (e.g., the rate at which the events are received exceeds the rate at which the servers can process the events), thereby causing a (1) denial of service for other (e.g., normally operating) computing devices, (2) crash of the servers, or (3) another type of issue.

SUMMARY OF THE INVENTION

This Summary provides a simplified form of concepts that are further described below in the Detailed Description. This Summary is not intended to identify key or essential features and should therefore not be used for determining or limiting the scope of the claimed subject matter.

In some examples, a server may receive a set of events from individual computing devices of a plurality of computing devices. For example, the server may receive first data identifying a first set of events that occurred on a first computing device and receive second data identifying a second set of events that occurred on a second computing device. The server may determine an event rate at which events are being received based at least in part on: the first set of events, the second set of events, and a time interval. The server may perform an analysis of at least the first set of events and the second set of events, and create, based on the analysis, a policy to reduce the event rate. The server may provide the policy to at least the first computing device and the second computing device. The first computing device and the second computing device may each send one or more additional sets of events to the server in accordance with the policy.

BRIEF DESCRIPTION OF THE DRAWINGS

A more complete understanding of the present disclosure may be obtained by reference to the following Detailed Description when taken in conjunction with the accompanying Drawings. In the figures, the left-most digit(s) of a reference number identifies the figure in which the reference number first appears. The same reference numbers in different figures indicate similar or identical items.

FIG. 2 is a block diagram illustrating examples of types of events, according to some embodiments.

FIG. 3 is a block diagram illustrating examples of types of policies, according to some embodiments.

DETAILED DESCRIPTION

Figure 1:
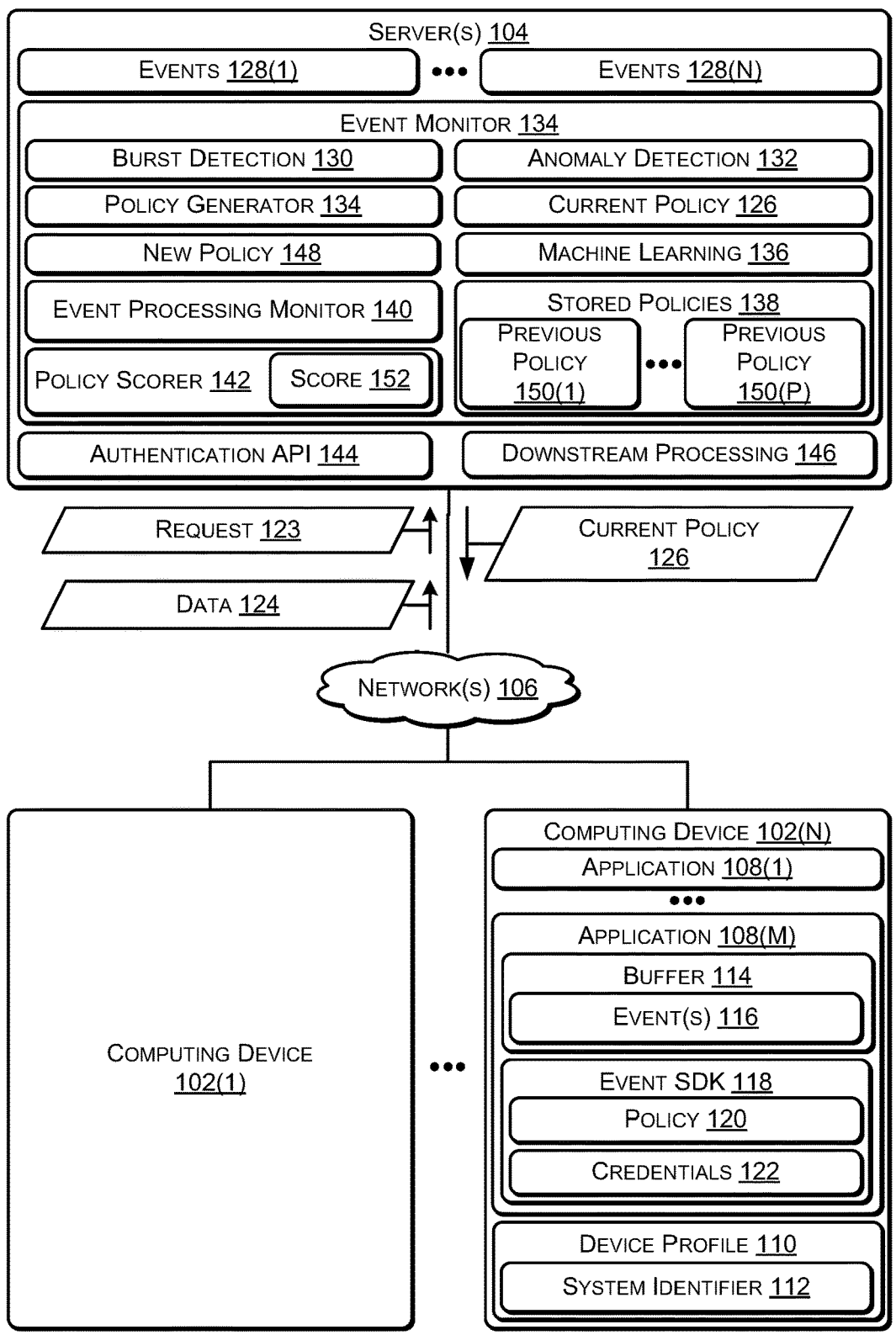
FIG. 1 is a block diagram of a system that includes multiple computing devices sending data to a server, according to some embodiments.

For purposes of this disclosure, an information handling system (IHS) may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or video display. The information handling system may also include one or more buses operable to transmit communications between the various hardware components.

A computer manufacturer, such as, for example, Dell®, may install a software agent on each computing device (e.g., laptop, tablet, desktop, server, and the like) before the computing device is shipped. The software agent installed on the computing device may gather data associated with the computing device, such as when the computing device is turned on for very first time, determine which retailer (e.g., Walmart®, Dell.com, Best Buy®, and the like) the computing device was purchased from, when an operating system that was installed by the factory crashed and what caused the crash (e.g., software bug, hardware bug, firmware bug or the like), when a software application that was installed prior to shipping crashed and what caused the crash, whether a blue screen of death (BSOD) occurred, how often an involuntary (e.g., non-user initiated) restart of the computing device has occurred, when the user selected (e.g., clicked on) a particular selection (e.g., to provide a rating for the computing device on a review site), and other device-related information. The data sent by the agent may include a unique identifier, such as a service tag or a serial number, that enables the servers to identify the computing device, thereby enabling the servers to identify the device's original hardware profile (e.g., which hardware components were installed at the factory) and the device's original software profile (e.g., which software applications and operating system were installed at the factory). Each agent installed on a computing device may use a key, such as an application programming interface (API) key, to prevent unauthorized agents (or other entities) from sending data to the servers. An API key is a code passed by the agent when calling an API to identify the agent and indicate that the agent is authorized to access the API to send the data.

The agent may periodically (e.g., at a predetermined time interval) or in response to a particular set of events (e.g., multiple restarts within a particular time interval, multiple crashes by a particular software application within a particular time interval, and the like), send the gathered data to the servers (e.g., cloud-based servers associated with the manufacturer). The servers are an example of an IHS. The servers may analyze the data to identify how users are using the computing device, e.g., which software applications are being used, an amount of time each application is being used, when (e.g., time of day, day of the week, and the like) the application is being used, which hardware components are being used, which peripherals have been or are current connected to the computing device, and the like. In some cases, the manufacturer of the computing device may perform an analysis of the data sent by the agent and make software, hardware, and/or peripherals recommendations based on the analysis. For example, if the computing device spends a large amount of time executing applications that make use of a hard drive or the main memory (e.g., random access memory (RAM)), the manufacturer may send an offer to upgrade the hard drive from a mechanical drive to a solid-state drive (SSD) or purchase additional memory.

In some cases, a bug in the software, hardware, firmware (or any combination thereof) of the computing device may cause the computing device to send significantly more (e.g., at least 20% more) data than normal. If multiple computing devices have a similar or same bug, then the multiple computing devices may send an amount of data to the servers sufficient to overwhelm the servers. In other cases, the API key may be stolen or hacked and used by one or more unauthorized entities to send an amount of data to the servers sufficient to overwhelm the servers. When the servers are overwhelmed by data, undesirable consequences may occur, such as, for example, a (1) denial of service (DoS) for other (e.g., normally operating) computing devices, (2) crash of the servers, (3) telemetry data becoming lost or discarded due to the inability of the servers to process the telemetry data at the rate at which the telemetry data is being received, or (4) another type of issue caused by a large (e.g., more than expected/normal) amount of data.

The systems and techniques described herein provide examples how one or more servers that are receiving telemetry data from multiple computing devices may determine the rate at which the telemetry data is being received, and if the rate satisfies a particular threshold, the server may create a new policy or select a previously created policy to throttle the telemetry data to reduce the rate at which the telemetry data is being received. Throttle means that the policy instructs individual computing devices to store particular types of events in a local buffer and then send the particular types of events at a later date and/or time, e.g., during off-peak times when the server is historically receiving, on average, fewer events (e.g., lower received event rate). For example, the policy may be created or selected to reduce an amount of the particular type of data that is causing the rate to satisfy (e.g., exceed) the particular threshold. The policy may be provided to computing devices that request permission to send telemetry data to the servers.

A computing device manufacturer, such as, for example, Dell®, may install multiple applications on each computing device before each computing device is sent to someone who has acquired (e.g., leased or purchased) each computing device. Each application may generate events and the events may be sent to a set of servers (e.g., "the cloud") for analysis. Thus, millions of computing devices may each send hundreds and sometimes thousands of events each day. The events may be of different types, such as a "heart beat" event, (e.g., this application is still installed and executing), a log (e.g., a log indicating that software was downloaded, a log indicating that the software was successfully installed, etc.), a memory dump (e.g., due to an application crashing), and the like. The manufacturer may process the events to determine how the computing devices can be further improved to reduce issues and improve customer satisfaction.

One issue with receiving such large amounts of data is scaling. For example, users tend to use their computing devices the most at certain peak times, e.g., 9:00 AM (soon after arriving in the office), at noon (e.g., to do work while others are at lunch or to take care of personal items), and at 400 PM (e.g., when meetings are over and each user is wrapping up this day and getting ready for the next day). While many cloud service providers can scale the capacity, this can become very expensive. In such cases, the manufacturer may have to decide between paying more money to scale up the capacity of the cloud to handle the increased event traffic or allowing a portion of the data to be lost and unprocessed. The systems and techniques described herein enable the manufacturer to detect when a burst of events has been received and select a previously created policy or create a new policy that throttles the events and reduces the number of events that are being sent, thereby avoiding having to pay more to scale up the cloud capacity and without losing any of the data. For example, the policy may instruct different groups of computing devices to send particular types of events at different dates in the future. For example, a first group of computing devices may be instructed to store particular types of events in a local buffer and then send the particular types of events in Z days (Z>0), a second group of computing devices may be instructed to send the particular types of events in Z+1 days, a third group of computing devices may be instructed to send the particular types of events in Z+2 days, and so on. In this way, the particular types of events are not sent all at once.

The systems and techniques use anomaly detection (e.g., detecting when an unusual circumstance, such as a software bug, a firmware bug, a hardware bug, or malware, is causing the burst of events), burst detection (detecting that the current rate at which events are being received is close to the rate at which the servers can process the events), and real-time event stream monitoring to detect in real-time when event bursts and/or anomalies are occurring and dynamically create or select a policy, based on the characteristics of the events, to push to computing devices, that causes the computing devices to behave in a way that is conducive to processing the data (e.g., rate at which events are being received is less than the event ingestion capacity). For example, the policy may instruct the computing devices to store some events in a local buffer and send the buffered events at a later date, thereby temporarily throttling some events. For example, low priority events may be throttled while high priority events may not be throttled.

A cloud fitness index (CFI) may be determined based on a rate at which events are currently being received compared to a maximum rate at which events can be processed. The CFI may be used by a policy generation engine to create a new policy or select a previously created policy and set the new or selected policy as a current policy. Each computing device must authenticate with the cloud-based servers to get a token to send telemetry data. When a computing device authenticates (e.g., by providing credentials) to get a token, the server may provide the computing device with the current policy. Thus, the current policy may be created or selected based on current conditions (e.g., current rate at which events are being received).

Each software application that sends telemetry data (e.g., events) to the server may have a software development kit (SDK). Multiple applications on each computing device may send telemetry data. For example, a driver update application may generate multiple events: an event indicating a that the computing device needs a new driver, an event indicating that the download of the driver has been initiated, and an event indicating that the driver was successfully installed. As another example, a help application may provide users with information on how to use the computing device, e.g., how to connect to a wireless network, how to troubleshoot an issue, how to search a knowledgebase, and the like. The application may generate telemetry data that includes events indicating what keywords were used to perform a search, which hyperlinks the user selected, which pages in the knowledgebase were read by the user, whether the user clicked "like" or "dislike" at the bottom of the knowledgebase page, and the like.

Typically, bursts of events (e.g., a large number of events received in a relatively short period of time) cause issues because if the incoming traffic exceeds a particular threshold, then the cloud provider may scale the capacity of the cloud servers, resulting in premium tier pricing, thereby increasing expenses. The CFI shapes the current policy and the current policy is designed to reduce incoming event traffic and prevent the cloud-based servers from scaling into premium tier pricing. Anomaly detection and burst detection may be used to detect abnormal conditions, determine the CFI, and generate a new policy so devices that are about to send telemetry will receive the most current policy and adjust, e.g., by throttling some events.

Throttling means that the computing devices may hold on to the data (e.g., non-urgent events) in a local buffer and send the data to the server at a later date. For example, "heartbeat" event that indicates that a software application is functioning normally may be sent once every 2 weeks. An event such as the heartbeat event that is low priority and infrequent, may be a candidate for throttling. The policy may be on a per-event type basis—throttle a first particular type of event, do not throttle a second particular type of event. For example, an event indicating an installation failure may not be a candidate for throttling. If a driver fails to install, the manufacturer may want to know as soon as possible about the failure to enable the manufacturer to troubleshoot and modify the driver to address the failure.

Burst detection may include determining that more than a certain number of events have been received in a particular time period (e.g., same event from multiple devices or multiple events from a single device). Anomaly detection may detect anomalies in real-time. For example, if bursts are known to historically occur at 9:00 AM, 12:00 (noon), and 400 PM, then the anomaly detector may ignore bursts and looks for a bug that is generating a large number of events at other times during the day. If multiple computing devices are generating a large number of a particular type of event or a particular device is generating a large number of multiple types of events, then the policy may be created or selected to instruct the multiple computing devices to not send the particular type of event or instructing the particular device to not send the multiple types of events.

As an example, a server may include one or more processors and one or more non-transitory computer readable media storing instructions executable by the one or more processors to perform various operations. The operations may include receiving a set of one or more events from individual computing devices of multiple computing devices. For example, the operations may include receiving, from a first computing device, first data identifying a first set of events that occurred on the first computing device and receiving, from a second computing device, second data identifying a second set of events that occurred on the second computing device. The operations may include determining an event rate at which events are being received based at least in part on: (1) the first set of events, (2) the second set of events, and (3) a time interval that includes a first time that the first set of events was received and a second time that the second set of events was received. The operations may include determining that the event rate satisfies a predetermined threshold (e.g., the event rate is greater than or equal to a rate at which the server is capable of processing events). The operations may include performing an analysis of at least the first set of events and the second set of events and creating, based on the analysis, a policy to reduce the event rate, and providing the policy to at least the first computing device and the second computing device. For example, if an increase in the event rate is caused by an issue with a particular hardware component, the policy may include an instruction (to the computing devices) to stop sending events associated with the particular hardware component. If an increase in the event rate is caused by an issue with a particular software application, the policy may include an instruction (to the computing devices) to stop sending events associated with the particular software application. If an increase in the event rate is caused by a particular type of event occurring on one or more computing devices, the policy may include an instruction (to the computing devices) to stop sending the particular type of event.

The operations may include receiving, from a third computing device, a request to send a third set of events that occurred on the third computing device. The request may include credentials associated with the third computing device. The operations may include providing the policy to the third computing device after authenticating the credentials of the third computing device. The operations may include receiving a portion of the third set of events from the third computing device, where the portion is selected in accordance with the policy. A remainder of the third set of events may be received from the third computing device after a predetermined amount of time has elapsed, where the predetermined amount of time is specified by the policy. For example, the policy may specify that higher priority events (e.g., events with a priority greater than or equal to a threshold priority specified by the policy) are to be sent to the server shortly (e.g., within a predetermined time period) after the higher priority events occur while low priority events are to be buffered locally (e.g., at each computing device) and then sent at a later time (e.g., after the predetermined time interval). The operations may include determining a second event rate based at least in part on the third set of events and determining that the second event rate satisfies a second predetermined threshold. The operations may include performing a second analysis of at least the third set of events and selecting, based at least in part on the second predetermined threshold and the second analysis, a predetermined policy to reduce the event rate. The operations may include setting the predetermined policy as the policy and providing the policy to at least one additional computing device. For example, a particular software application may be identified as generating a disproportionately large number of events, a policy may be created that includes an instruction to the computing devices to temporarily stop sending events generated by (or associated with) the particular software application, and the policy may be stored for future use. If, in the future, an update to the particular software application causes the particular software application to again generate a disproportionate number of events, the previous policy may be selected from a set of stored policies, set as the current policy, and provided to computing devices that send a request to send events to the server.

FIG. 1 is a block diagram of a system 100 that includes a computing device sending data to a server, according to some embodiments. The system 100 may include multiple computing devices 102 coupled to a server 104 via one or more networks 106. For example, the computing devices 102 may include a computing device 102(1) to computing device 102(N) (where N is greater than 0). The computing devices 102 may include one or more of a laptop, a tablet, a desktop, a smart phone, or another type of computing device.

Each of the computing devices 102 may include multiple software applications. For example, the computing device 102(N) may include applications 108(1) to 108(M). Each of the computing devices 102 may include a device profile 110 that includes information associated with the computing device 102. For example, the computing device 102(N) may include a hardware configuration profile of the computing device 102(N), a software configuration profile of the computing device 102(N), a system identifier 112 (e.g., a serial number or service tag that uniquely identifies each computing device 102), and other device-related information.

One or more of the applications 108 may send data 124 to the server 104. The applications 108 may send the data 124 periodically (e.g., at a predetermined time interval, such as, every hour, every 6 hours, every day, every week, every month, or the like) or in response to one or more particular events occurring, such as a software update failing to install correctly. The software update may include (1) a driver, (2) firmware for a hardware component or a basic input/output system (BIOS) of the computing device 102, (3) an update to a software application, or any combination thereof. The application 108(M) may include a buffer 114 to store one or more events 116. The events 116 may include logs (e.g., installation logs), memory dumps, application crashes, user interactions with the computing device 102(N) (e.g., a user opens a help application and performs a keyword search), user-initiated and uninitiated operating system restarts, and other events associated with the computing device 102(N).

The buffer 114 may have a predetermined size (e.g., determined based on a size of an amount of storage capacity available in the computing device 102(N)) and may be configured in several different ways. For example, the buffer 114 may be configured as a FIFO (first in, first out), LIFO (last in, first out), or the like. Assume that each event can have a priority of either high priority, medium priority, or low priority. Of course, other types of prioritization schemes may be used (e.g., 0=lowest priority, 10=highest priority). For example, the current policy 126 may specify that all events, regardless of priority are to be stored in the buffer 114 and then sent to the server 104 at a later time and/or date. As another example, the current policy 126 may specify that high priority events and medium priority events are to be stored in the buffer 114 and then sent to the server 104 at a later time and/or date. The current policy 126 may specify that low priority events are to be stored in the buffer 114 but may be deleted/overwritten to make room to store medium and high priority events. As yet another example, the current policy 126 may specify that high priority events are to be stored in the buffer 114 and then sent to the server 104 at a later time and/or date. The current policy 126 may specify that medium and low priority events are to be stored in the buffer 114 but may be deleted/overwritten to make room to store high priority events. In this example, the application 108(M) may first overwrite low priority events in the buffer 114 with high priority events. If the buffer 114 does not include any low priority events, then the application 108(M) may overwrite medium priority events in the buffer 114. If the buffer 114 does not include any medium or low priority events, then the application 108(M) may overwrite high priority events in the buffer 114 according to either FIFO (e.g., most recent high priority event in the buffer 114 is overwritten) or LIFO (e.g., oldest high priority event in the buffer 114 is overwritten).

The application 108(M) may include an event software development kit (SDK) 118 that includes a policy 120 and credentials 122. The application 108(M) may use the event SDK 118 to send at least a portion of the events 116 to the server 104. In some cases, multiple applications of the applications 108 may include the event SDK 118 and use the event SDK 118 to send events to the server 104. The application 108 (M) may determine which events to store in the buffer 114 based on the policy 120 and determine which portion of the events 116 to send to the server 104 based on the policy 120. For example, the policy 120 may specify that when the application 108(M) performs particular actions then the events generated by those actions are to be stored in the buffer 114.

The policy 120 may specify that the computing device 102(N) is to periodically (e.g., at a predetermined time interval) or in response to a particular event (or set of events) send at least a portion of the events 116 to the server 104. Prior to sending the events 116 to the server 104, the computing device 102(N) may send a request 123 to the server 104. The request 123 may include the credentials 122 to enable the server 104 to authenticate the credentials 122. The request 123 may include a region with which the computing device 12(N) is associated with and other metadata. Multiple applications on each of the computing devices 102 may send the request 123 to have the credentials 122 authenticated and obtain permission to send the events 118 to the server 104.

After the server 104 authenticates the credentials 122 associated with the computing device 102, the server 104 may provide the computing device 102 with a current policy 126. The computing device 102 may replace the policy 120 with the current policy 126 and send at least a portion of the events 116 according to the current policy 126. For example, the computing device 102(N) may send data 124 to the server 104. The data 124 may include the at least a portion of the events 116 from the buffer 114 that are selected based on the policy 120. In some cases, the data 124 may also include the device profile 110 with the software configuration data, hardware configuration data, and the system identifier 112. The portion of the events 116 and the device profile 110 that are included in the data 124 may be selected based on the current policy 126.

The server 104 may store events received from one or more of the computing devices 102. For example, the server 104 may store events 120(1) to 128(N) received from one or more of the computing devices 102. A manufacturer of the computing devices 102 may analyze the stored events 128 for various reasons, including (1) improving the way in which subsequently manufactured computing devices are configured at the factory to make the computing devices easier to use, (2) identifying and avoiding the use of hardware components that are prone to failure or that are difficult to configure or use, (3) identifying how the computing devices 102 are being used and including additional hardware and/or software in subsequently manufactured computing devices that increases the functionality and/or reduces the time to perform commonly performed tasks, and the like.

The server 104 may include an event monitor 134. The event monitor 134 may include a burst detection module 130, an anomaly detection module 132, and a policy generator 134. The burst detection module 130 may be used to determine when a burst of events have been sent to the server 104 from multiple ones of the computing devices 102. For example, a burst may be a large number (e.g., thousands or millions) of events received in a short period of time (e.g., in a few seconds). The anomaly detection module 132 may detect when an anomaly (e.g., a hardware issue, a firmware issue, or a software issue) is causing an unusually large number of events to be generated and sent to the server 104.

The burst detection module 130 and the anomaly detection module 132 may be used to detect when the rate at which events are being received is greater than a predetermined threshold (e.g., within a predetermined amount or percentage of the rate at which the server 104 can process incoming events). For example, assume the server 104 can process X events per second (X>0) and assume the burst detection module 130 or the anomaly detection module 132 determine that Y events (Y>0) per second are being received. If ((Y divided by X) multiplied by 100)>90%, then the server 104 is close to operating at maximum capacity. To illustrate, if X is 1,000,000 and Y is 950,000, then the server 104 is operating at 95% capacity, which is greater than the threshold of 90%. In such cases, the policy generator 134 may create a new policy 148 or select a previously created policy from one of stored policies 138 (e.g., previously created policies 150(1) to 150(P), P>0) and set the new policy 148 or the previously created policy as the current policy 126. For example, the new policy 148 or the previously created policy may specify that one or more particular types of events (e.g., that are causing the burst of events) are not to be sent to the server 104 or are to be buffered (e.g., stored in the local buffer 114) and sent to the server 104 at a future date (e.g., Z days from today) specified by the policy. The server 104 may provide the current policy 126 to additional ones of the computing devices 102 that send the request 123 to the server 104, requesting permission to send the data 124 (e.g., including the events 116). In this way, the server 104 may throttle the sending of events at the computing devices 102 (e.g., at the edge of the system 100). Throttle means that the computing devices 102 that receive the current policy 126 may store particular types of events in a local buffer and then send the buffered events to the server 104 at a later date and/or time (e.g., midnight, 1:00 AM, 2:00 AM or the like), e.g., when the server 104 historically receives events at a lower rate. For example, after the burst detection module 130, the anomaly detection module 132, or both detect receiving an initial burst of events from one or more of the computing devices 102, the policy generator 134 may either (i) create the new policy 148 or (ii) select one of the stored policies 138. The server 104 may provide either (i) or (ii) as the current policy 126 to those of the computing devices 102 that subsequently present credentials and request permission to send events to the server 104. The current policy 126 is created or selected based on the ability of the current policy 126 to reduce the number of events being sent to the server 104. In this way, if an excess of particular types of events are being generated, these events may be throttled (or discarded) at the computing devices 102.

As an example of burst detection, assume a particular software application generates a set (e.g., of one or more) events when the particular software application (e.g., Dell® Updater) is initially launched. If an updated version of the particular software application is installed on multiple ones of the computing devices 102 and multiple users launch the particular software application within a short period of time (e.g., 15 minutes), then the burst detection module 130 may determine that a burst of the multiple sets of events from the particular software application were received. The policy generator 134 may create or select the current policy 126 that instructs the computing devices 102 to buffer events generated by the particular software application and send them at a later date (e.g., today+Z days, Z>0).

The event monitor 134 may include a machine learning module 136, the stored policies 138, event processing monitor 140, and a policy scorer 142. The server 104 may include an application programming interface (API) 144 and one or more downstream processing modules 146. The policy generator 134 may create or select the current policy 126 based on analysis of the burst of events being received. A burst of events may occur when multiple events are received at a rate that is close to (e.g., within a predetermined percentage of) a rate at which the server 104 is capable of processing events. In some cases, the anomaly detection module 132 may detect that a particular hardware component or a particular software application is sending more events than normal (e.g., based on historical data). The anomaly detection module 132 may determine whether the events 128 are being generated based on a hardware issue, a firmware issue, a software issue, or another issue. The policy generator 134 may receive input from the burst detection module 130 and from the anomaly detection module 132 and determine a current policy 126. For example, if the modules 130, 132 determine that a particular software application has a bug and is generating a significant amount of the events that are being received, then the policy generator 134 may create (or select) the current policy 126 that includes instructions to not send events generated by the particular software application. The downstream processing modules 146 may analyze the events 128 to identify how users are using the computing devices 102, which software applications are used the most, which software applications are used the least, how long the software applications are used, and other data that the manufacturer can use to improve the functionality of future computing devices to better support the most popular user activities.

The machine learning module 136 may be used by the policy generator 134 to predict the cause of the burst of events. The policy generator 134 may use the machine learning module 136 to create the new policy 148 or select one of the stored policies 138. After the current policy 126 has been created, the current policy 126 may be stored as one of the stored policies 138 and re-selected in the future. For example, if a particular hardware component is prone to failure and repeatedly causes applications to generate a significant number of events when the hardware component fails, the current policy 126 may be stored and reused if the hardware component fails in the future and causes a large burst of events.

The event processing monitor 140 may determine the usage of computing resources associated with the server 104, such as central processing unit (CPU) utilization, memory utilization, input/output (I/O) bandwidth, I/O utilization, errors/faults of the various modules in the event monitor 134. The policy scorer 142 may use the information determined by the event processing monitor 140 to create a score 152 (e.g., cloud fitness index (CFI)) for the current policy 126. The score 152 may indicate how effective the current policy 126 is in reducing the data 124 being received from the computing devices 102 relative to the rate at which the server 104 is capable of processing events.

Thus, a manufacturer may enable multiple applications that are pre-installed on each of multiple computing devices to send telemetry data to a cloud-based server. For example, the telemetry data may include a device profile (e.g., a hardware configuration and a software configuration of a computing device), a unique identifier (e.g., serial number and/or service tag) that uniquely identifies the computing device, and events that occurred on the computing device. In some cases, the events may be associated with one of the applications that are capable of sending telemetry data to the cloud-based server. For example, the events may include an event identifying the absence of a latest version of a software package (e.g., the software package may include an updated driver, an updated firmware, and/or an updated software application), an event indicating that the software package is being download, and an installation log indicating whether or not the software package was successfully installed and any issues encountered during the installation.

The cloud-based server may receive telemetry data, including multiple sets of events, from multiple computing devices. A burst detector may be used to detect when a burst of events has been received. A burst of events may be detected when an incoming event rate, e.g., number of events received within a particular time period, satisfies a particular threshold that is correlated to the capacity of the cloud-based server to process events. For example, assume the cloud-based server has a capacity to process (e.g., a maximum of) 1,000,000 events per minute, and the threshold is set at 900,000 events per minute (e.g., 90% capacity). If the cloud-based server determines that the incoming event rate is 950,000 events received in a minute, then the burst detector may determine that a burst of events was received because the event rate satisfies the threshold. A machine learning module (e.g., Random Forest, Support Vector Machine, or other machine learning module) may analyze the burst of events and predict how to throttle the events. For example, if a particular type of event is causing the burst, then the particular type of event may be throttled. If a particular set of events is causing the burst, then the particular set of events may be throttled. If a particular application is causing the burst, then events generated by the particular application may be throttled. If a particular hardware component is causing the burst, then events generated by the particular hardware component may be throttled. If a previously created policy incorporates the particular type of throttling predicted by the machine learning module to address the event burst, then the previously created policy may be selected and set as the current policy. If the previously created policies do not address the particular type of throttling predicted by the machine learning module to address the event burst, then a new policy may be created and set as the current policy. After the burst has been detected and a new policy created or a previous policy selected as the current policy, computing devices that present credentials and request authorization to send data to the server may be provided with the current policy. In this way, particular types of events that caused the burst of events may be throttled by instructing the computing devices to locally buffer the particular types of events and send the buffered events at a late time or date. For example, the policy may instruct the computing devices to send the buffered events during off-peak times, such as midnight, 1:00 AM, 2:00 AM, or the like. In this way, the cloud-based server may avoid the cloud provider scaling the server to a higher pricing tier to accommodate the burst of events, thereby saving the manufacturer of the computing device money by not having to pay for the higher pricing tier.

FIG. 2 is a block diagram 200 illustrating examples of types of events, according to some embodiments. An event type 202 may have an associated frequency 206, whether or not the event is to be throttled indicator 208, and a priority 210. Information similar to that included in FIG. 2 may be stored by the event monitor 134 and used to create the new policy 148 or select one of the previous policies 150. A description 212 is provided for discussion purposes herein and may not be stored by the event monitor 134.

For example, a software application may generate a one-time ping event 214 indicating that the application has begun executing for the first time after a computing device (e.g., on which the application is installed) has being acquired (e.g., purchased or leased) by a user. The one-time ping 214 may have a low frequency (e.g., occurs only once), may not be a candidate for throttling (e g, manufacturer desires to know when such an event occurs), and may have a low priority.

A software application may periodically generate a heartbeat event 216 indicating that the application is executing. The heartbeat 216 may have a medium frequency (e.g., sent at a predetermined time interval, such as once a week), may be a candidate for throttling, and may have a low priority.

A software application may generate a software utilization event 218 identifying the software application's utilization of software resources. The software utilization event 218 may have a variable frequency (e.g., generated periodically, each time the software application is executed, or the like), may be a candidate for throttling (e.g., manufacturer may desire to know what software resources the software application is using), and may have a medium priority. For example, the software utilization event 218 may identify which drivers and which versions of the drivers the software application is using, which functions or tools in a software library the software application is using, additional software applications that the software application is using, and the like.

A software application may generate a hardware utilization event 220 identifying the software application's utilization of hardware resources. The hardware utilization event 220 may have a variable frequency (e.g., generated periodically, each time the software application uses a particular hardware resource, or the like), may be a candidate for throttling (e.g., manufacturer may desire to know what resources the software application is using), and may have a high priority. For example, if a software application use of one or more computing resources, such as CPU cycles, main memory (RAM), storage capacity (e.g., disk drive space), networking bandwidth, or the like satisfies a particular threshold (or set of thresholds), then the manufacturer may determine that the software application is making inefficient use of the hardware resources and modify/update the software application to use a smaller amount of the hardware resources.

Of course, FIG. 2 merely provides a few examples of types of events. It should be understood that other types of events may be defined by the manufacturer of the computing devices 102.

FIG. 3 is a block diagram 300 illustrating examples of types of policies, according to some embodiments. A policy 302 may have an associated policy type 304 and a trigger 306. The event monitor 134 may select a previous policy or create a new policy similar to those illustrated in FIG. 3. A description 308 is provided for discussion purposes herein and may not be stored by the event monitor 134.

A low throttling policy 310 may be a preset policy (e.g., one of the stored policies 138), and have a first threshold (e.g., X % of capacity, such as, for example, 70% of the rate at which the server 104 can process events). For example, the low throttling policy 310 may throttle at least a portion of events that have a low priority, are sent infrequently, or both.

A medium throttling policy 312 may be a preset policy (e.g., one of the stored policies 138), and have a second threshold (e.g., Y % of capacity, such as, for example, 80% of the rate at which the server 104 can process events). For example, the medium throttling policy 312 may throttle at least a portion of events that have a low priority, a medium priority, are sent infrequently, or any combination thereof.

A high throttling policy 314 may be a preset policy (e.g., one of the stored policies 138), and have a third threshold (e.g., Z % of capacity, such as, for example, 90% of the rate at which the server 104 can process events). For example, the high throttling policy 314 may throttle at least a portion of events that have a low priority, a medium priority, a high priority, are sent infrequently, or any combination thereof.

A regional routing policy 316 may be a policy (e.g., the new policy 148) that is dynamically created (e.g., triggered) in response to the burst detector 130 or the anomaly detector 132 detecting that a large number of events have been received in a relatively short period of time. For example, the regional routing policy 316 may determine that computing devices in a particular region (e.g., city, state, country, or set of countries) are generating a large amount of event traffic and route at least a portion of the traffic to a cloud-based server that is designed to process events from a different region. To illustrate, if a burst of events is detected 9:00 AM Eastern time by a server that processes events from computing devices located on the East coast of the United States, the server may select a policy that routes at least a portion of the traffic to a second server that processes events from computing devices located on the West coast, because it is 600 AM Pacific time and the rate at which events are being received from computing devices located on the West coast may be relatively low. Alternately, the server may select a policy that routes at least a portion of the traffic to a second server that processes events from computing devices located in Asia, because it is late in the evening in Asia and the rate at which events are being received from computing devices located in Asia may be relatively low.

An adaptive throttling policy 318 may be a policy (e.g., the new policy 148) that is dynamically created (e.g., triggered) in response to the burst detector 130 or the anomaly detector 132 detecting that a large number of events have been received in a relatively short period of time. For example, the server 104 may determine that (1) an updated version of a particular software application was recently released, (2) multiple computing devices downloaded and installed the updated version, and (3) the updated version includes a bug that causes the particular software application to generate a large number of events. The server 104 may dynamically create a policy to throttle at least some types of events that are generated by the updated version of the particular software application (but not older versions). Thus, depending on the types of events that are being received, the application that is generating the events, and other data (e.g., included in the telemetry data 124 that is sent to the server 104), the machine learning module 136 may predict what is causing the high rate of events and enable the server 104 to create the new policy 148 to throttle the types of events that are being received most frequently.

Of course, FIG. 3 merely provides a few examples of different types of policies. It should be understood that a policy may be created dynamically to address a particular situation based on an analysis of the events being received.

Figure 4:
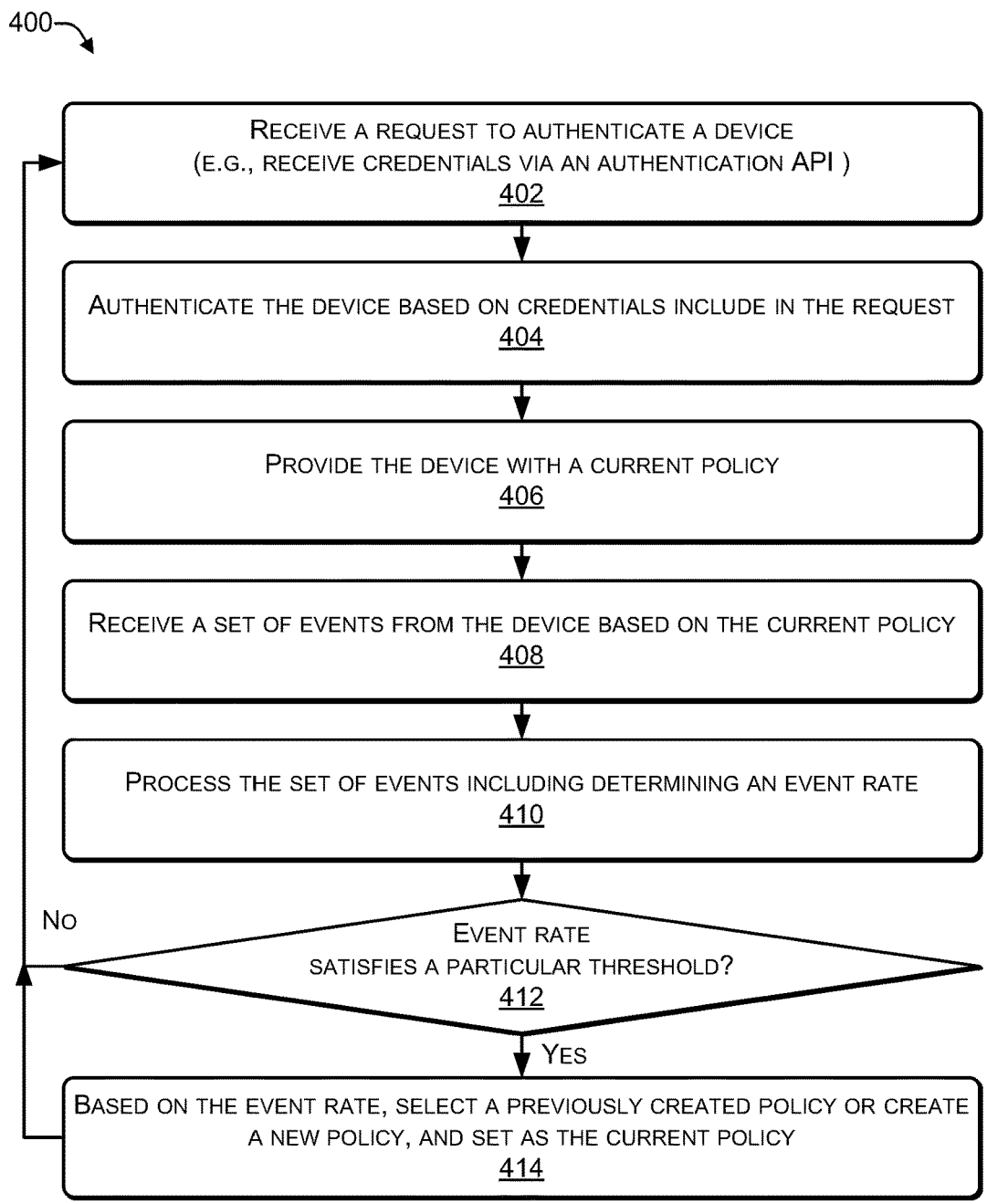
FIG. 4 is a flowchart of a process that includes providing a current policy to a device, according to some embodiments.
Figure 5:
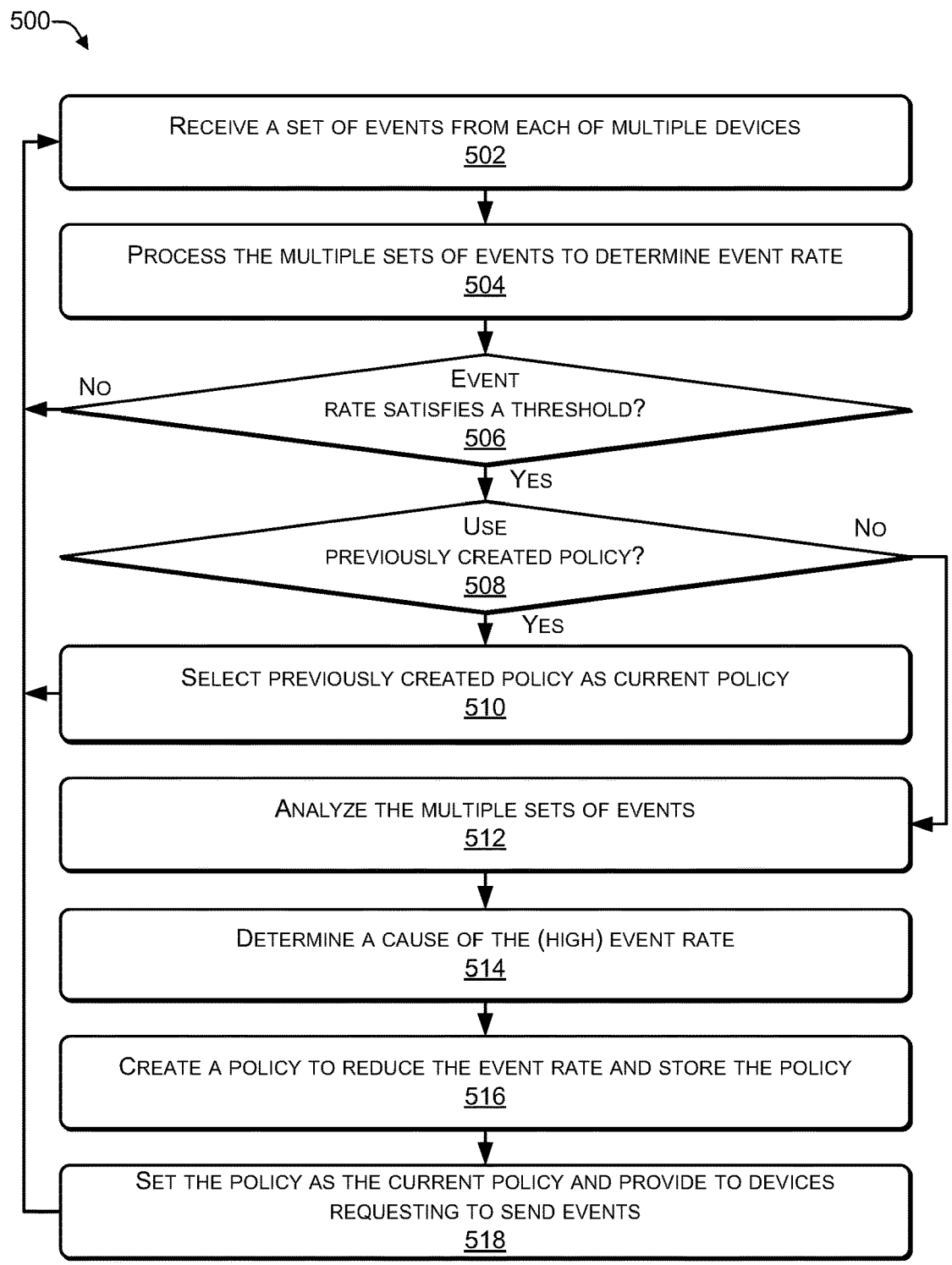
FIG. 5 is a flowchart of a process that includes creating a policy to reduce an event rate, according to some embodiments.
Figure 6:
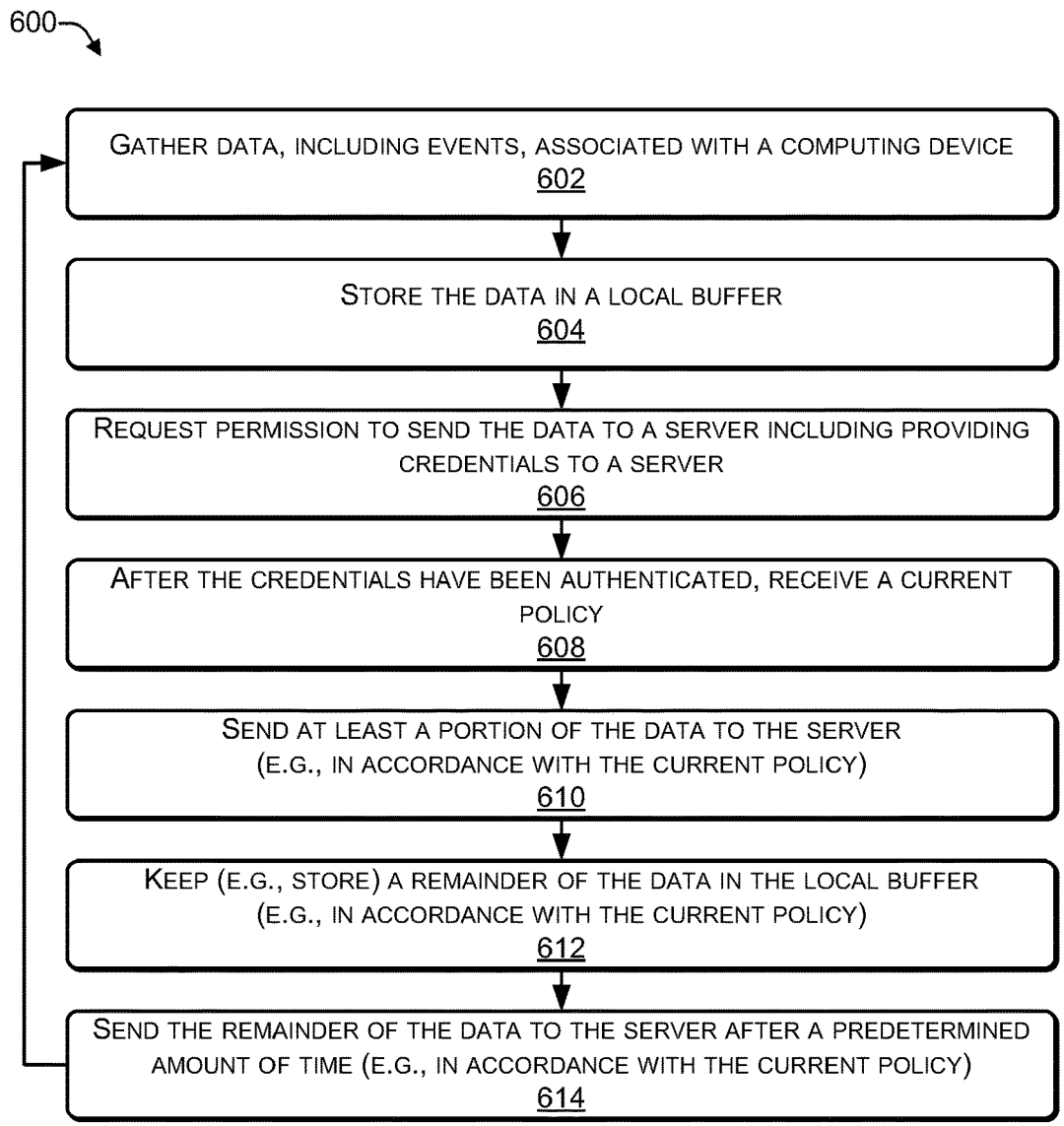
FIG. 6 is a flowchart of a process that includes providing credentials to a server, according to some embodiments.

In the flow diagrams of FIGS. 4, 5, and 6, each block represents one or more operations that can be implemented in hardware, software, or a combination thereof. In the context of software, the blocks represent computer-executable instructions that, when executed by one or more processors, cause the processors to perform the recited operations. Generally, computer-executable instructions include routines, programs, objects, modules, components, data structures, and the like that perform particular functions or implement particular abstract data types. The order in which the blocks are described is not intended to be construed as a limitation, and any number of the described operations can be combined in any order and/or in parallel to implement the processes. For discussion purposes, the processes 400, 500, and 600 are described with reference to FIGS. 1, 2, and 3, as described above, although other models, frameworks, systems and environments may be used to implement this process.

FIG. 4 is a flowchart of a process 400 that includes providing a current policy to a device, according to some embodiments. The process 400 may be performed by a stand-alone server or a cloud-based server, such as the server 104 of FIG. 1.

At 402 a request to authenticate a device may be received. At 404, the device maybe authenticated based on credentials included in the request. At 406, the device may be provided with a current policy. For example, in FIG. 1, the computing device 102(N) may send the request 123 including the credentials 122 to the server 104 (e.g., via the authentication API 144). After authenticating the credentials 122, the server 104 may provide the current policy 126 to the computing device. The current policy 126 may indicate which of the events 116 from the buffer 114 are to be sent to the server 104 and which of the events 116 from the buffer 114 are to be throttled, e.g., sent to the server 104 at a later date or time, as specified by the current policy 126. If the server 104 is unable to authenticate the credentials 122, then the request from the computing device 102(N) to send the events 116 in the buffer 114 may be denied.

At 408, a set of events maybe received from the device. The events that are sent may be selected based on the current policy. At 410, the set of events may be processed. For example, the processing may include determining an event rate (e.g., number of events received within a particular time period). At 412 a determination may be made whether the event rate satisfies a particular threshold. In response to determining, at 412, that the event rate does not satisfy the particular threshold, the process may proceed to 402, where an additional request to authenticate an additional device may be received. In response to determining at 412, that the event rate satisfies the particular threshold, the process may proceed to 414, where a previously created policy may be selected or a new policy may be created and set as the current policy. The process may then proceed to 402, where an additional request to authenticate an additional device may be received. For example, in FIG. 1, the server 104 may receive the data 124 from one or more of the computing devices 102. The data 124 may include a portion of the events 116 that have been selected from the buffer 114 and sent according to the policy 120. The server 104 may process the events 128 and determine whether the rate at which the events 128 are being received satisfies a particular threshold. For example, the threshold may be (a percentage) based on the maximum capacity of the server 104 to process the events 128. If the rate at which the events 128 are being received satisfies the threshold, the server 104 may select one of the stored policies 138 or create the new policy 148 and set either one of the previous policies 150 or the new policy 148 as the current policy 126. The current policy 126 may be provided to additional computing devices that subsequently submit requests to send data to the server 104. The current policy 126 may cause the additional computing devices to throttle the types of events that are causing the high rate of events to be received at the server 104. For example, if a particular type of event (or set of events) is being generated and causing the server 104 to receive events at a rate that satisfies the threshold, then the current policy 126 may specify that the particular type of event (or set of events) is to be throttled, e.g., stored in the buffer 114 and sent at a later time and/or a later date that is specified by the current policy 126. To illustrate, the current policy 126 may specify that the particular type of event (or set of events) is to remain in the buffer 114 and sent at an off-peak time, such as 10:30 AM, 2:30 PM, after 6:00 PM, 12:00 (midnight), :00 AM or the like. In this way, by not exceeding the predetermined rate threshold, the cloud-based server may not be scaled to a higher cloud pricing tier, thereby saving money.

FIG. 5 is a flowchart of a process 500 that includes creating a policy to reduce an event rate, according to some embodiments. The process 500 may be performed by a stand-alone server or a cloud-based server, such as the server 104 of FIG. 1.

At 502, a set of events may be received from each of multiple devices. At 504, the multiple sets of events may be processed to determine an event rate. At 506, a determination may be made whether the event rate satisfies a threshold. If a determination is made, at 506, that the event rate does not satisfy the threshold, then the process may proceed to 502 where additional sets of events maybe received from additional devices. If a determination is made at 506, that the event rate satisfies the threshold, then the process may proceed to 508.

At 508, a determination may be made whether to use a previously created policy. For example, if an analysis of the multiple sets of events indicates that the same (or similar) event rate issue arose in the past and a policy was created at that time, then one of the previously created policies 150 may be selected and set as the current policy, at 510.

If a determination is made, at 508, that this issue has not previously arisen (e.g., the previously created policies 150 are not applicable to the current high event rate), then the process may proceed to 512 where the multiples sets of events may be analyzed. At 514, a determination as to a cause of the high event rate may be determined. At 516, a new policy to reduce the event rate maybe created and stored. At 518, the new policy may be set as the current policy and provided to devices that are requesting to send events to the server. For example, in FIG. 1, the server 104 may receive the events 128 from multiple computing devices (e.g., events 128(1) may be received from the computing device 102(1) and the events 128(N) may be received from the computing device 102(N)), such as the computing device 102(N). If the burst detection module 130 or the anomaly detection module 132 determines that the event rate satisfies (e.g., exceeds) a particular threshold, then the policy generator 134 may either select one of the previously stored policies 138 or create the new policy 148. For example, the machine learning module 136 may be used to analyze the events 128 to determine which type(s) of events are causing the high event rate. The policy generator 134 may create the new policy 148 and set the new policy 148 as the current policy 126. The current policy 126 may be provided to those of the computing devices 102 that are requesting to send events to the server 104. In this way, the cause of the high event rate may be mitigated by instructing the computing devices 102 to throttle the types of events that are causing the high event rate. Throttling particular types of events means that each of the computing devices 102 may keep the particular types of events in the local buffer 114 (e.g., rather than sending them to the server) for a particular period of time and then send the buffered events to the server during one or more off-peak dates and/or times specified by the current policy 126. In this way, e.g., by throttling events that are causing the event rate to satisfy a particular threshold, the cloud-based server may avoid being scaled to a higher cloud pricing tier, thereby saving money. By having computing devices throttle particular types of events and send the particular types of events to the server 104 at off-peak times provides time-based load balancing, enabling more efficient use of the cloud-based resources.

FIG. 6 is a flowchart of a process 600 that includes providing credentials to a server, according to some embodiments. The process 600 may be performed by a computing device, such as one of the computing devices 102 of FIG. 1.

At 602, the computing device may gather data, including events associated with the computing device. At 604, the data may be stored in a local buffer. For example, in FIG. 1, the computing device 102(N) may store the events 116 associated with the computing device 102(N) in the buffer 114. In some cases, the buffer 114 may also store the device profile 110 that includes a hardware configuration of the computing device 102(N), a software configuration of the computing device 102(N), and the system identifier 112.

At 606, the computing device may send a request to a server requesting permission to send the data to the server. The request may include the computing device's credentials. After the credentials have been authenticated, a current policy may be received by the computing device, at 608. For example, in FIG. 1, the application 108 may use the event SDK 118 to send the request 123 to present the credentials 122 to the server 104 via the authentication API 144. The request 123 may include region information (e.g., which region the computing device is associated with) and metadata. For example, each computing device 102 may send events to a regional server for processing. Thus, a computing device that is associated with the North American region may continue to send events to the server associated with North America even when the computing device is physically located in a different region, such as Europe or Asia. After the server 104 has authenticated the credentials 122, the server 104 may provide the current policy 126 to the computing device 102(N). The current policy 126 may specify which events are to be sent within a relatively short time (e.g., 5 minutes, 10 minutes or the like) after the events occur and which events are to be throttled, e.g., stored in the buffer 114 and sent to the server 104 at an off-peak time and/or date.

At 610, at least a portion of the data (e.g., in the local buffer) may be sent to the server, e.g., in accordance with the current policy. At 612, a remainder of the data remain stored in the local buffer, e.g., in accordance with the current policy. At 614, the remainder of the data may be sent to the server after a predetermined amount of time, e.g., in accordance with the current policy. For example, the computing device 102(N) may send a portion of the events 116 in the buffer 114 to the server 104 while a remainder of the events 116 may remain stored in the buffer 114. After a predetermined amount of time (e.g., specified by the current policy 126) the computing device 102(N) may send the remainder of the events 116 to the server, based on to a date and/or time specified by the current policy 126.

Thus, a software application executing on a computing device may gather data, including events, associated with the software application and store the data in a local buffer. The software application may send a request to a server requesting permission to send the data to the server. The request may include credentials associated with the software application. After the server has authenticated the credentials, the server may provide the software application with a current policy specifying which events to send in approximately real-time and which events are to be throttled, e.g., stored in the local buffer and sent to the server at an off-peak time (e.g., when the server is processing fewer events). The current policy may specify the off-peak times when the buffered events are to be sent to the server.

Figure 7:
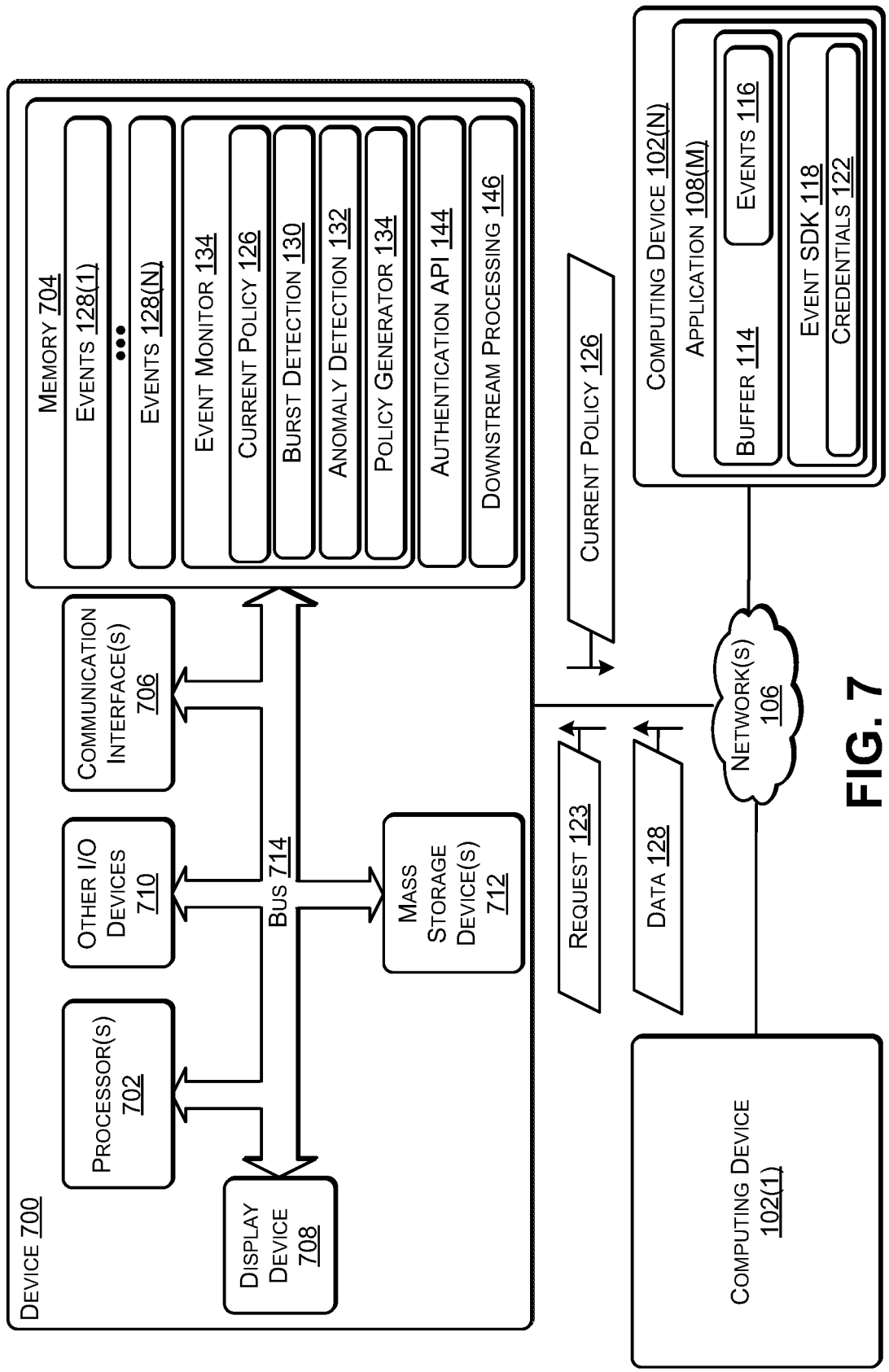
FIG. 7 illustrates an example configuration of a computing device that can be used to implement the systems and techniques described herein.

FIG. 7 illustrates an example configuration of a device 700 that can be used to implement the systems and techniques described herein, such as for example, the computing devices 102 and/or the server 104 of FIG. 1. As an example, the device 700 is illustrated in FIG. 7 as implementing the server 104 of FIG. 1.

The device 700 may include one or more processors 702 (e.g., CPU, GPU, or the like), a memory 704, communication interfaces 706, a display device 708, other input/output (I/O) devices 710 (e.g., keyboard, trackball, and the like), and one or more mass storage devices 712 (e.g., disk drive, solid state disk drive, or the like), configured to communicate with each other, such as via one or more system buses 714 or other suitable connections. While a single system bus 714 is illustrated for ease of understanding, it should be understood that the system buses 714 may include multiple buses, such as a memory device bus, a storage device bus (e.g., serial ATA (SATA) and the like), data buses (e.g., universal serial bus (USB) and the like), video signal buses (e.g., ThunderBolt®, DVI, HDMI, and the like), power buses, etc.

The processors 702 are one or more hardware devices that may include a single processing unit or a number of processing units, all of which may include single or multiple computing units or multiple cores. The processors 702 may include a graphics processing unit (GPU) that is integrated into the CPU or the GPU may be a separate processor device from the CPU. The processors 702 may be implemented as one or more microprocessors, microcomputers, microcontrollers, digital signal processors, central processing units, graphics processing units, state machines, logic circuitries, and/or any devices that manipulate signals based on operational instructions. Among other capabilities, the processors 702 may be configured to fetch and execute computer-readable instructions stored in the memory 704, mass storage devices 712, or other computer-readable media.

Memory 704 and mass storage devices 712 are examples of computer storage media (e.g., memory storage devices) for storing instructions that can be executed by the processors 702 to perform the various functions described herein. For example, memory 704 may include both volatile memory and non-volatile memory (e.g., RAM, ROM, or the like) devices. Further, mass storage devices 712 may include hard disk drives, solid-state drives, removable media, including external and removable drives, memory cards, flash memory, floppy disks, optical disks (e.g., CD, DVD), a storage array, a network attached storage, a storage area network, or the like. Both memory 704 and mass storage devices 712 may be collectively referred to as memory or computer storage media herein and may be any type of non-transitory media capable of storing computer-readable, processor-executable program instructions as computer program code that can be executed by the processors 702 as a particular machine configured for carrying out the operations and functions described in the implementations herein.

The device 700 may include one or more communication interfaces 706 for exchanging data via the network 110. The communication interfaces 706 can facilitate communications within a wide variety of networks and protocol types, including wired networks (e.g., Ethernet, DOCSIS, DSL, Fiber, USB etc.) and wireless networks (e.g., WLAN, GSM, CDMA, 802.11, Bluetooth, Wireless USB, ZigBee, cellular, satellite, etc.), the Internet and the like. Communication interfaces 706 can also provide communication with external storage, such as a storage array, network attached storage, storage area network, cloud storage, or the like.

The display device 708 may be used for displaying content (e.g., information and images) to users. Other I/O devices 710 may be devices that receive various inputs from a user and provide various outputs to the user, and may include a keyboard, a touchpad, a mouse, a printer, audio input/output devices, and so forth.

The computer storage media, such as memory 116 and mass storage devices 712, may be used to store software and data. For example, the computer storage media may be used to store the events 128, the event monitor 134, the authentication API 144, and the downstream processing modules 146.

Thus, a manufacturer may install a software agent (e.g., agent 108 of FIG. 1) on each of the computing devices 102. The agent may gather data associated with the corresponding one of the computing devices 102 and periodically (e.g., at a predetermined time interval) or in response to detecting a particular set of events, send the gathered data 144 to one or more cloud-based servers (e.g., the device 700). The data 144 may include a unique device identifier (e.g., service tag, serial number, or the like) and events (e.g., events 118 of FIG. 1) that have occurred on one of the computing devices 102. The events may include software application logs, operating system logs, number of restarts, the cause of the restarts, memory dumps created when an application or the operating system restarts, what responses the user has provided in response to the agent, a software application, or an operating system displaying a user interface in which the user can select one of multiple selections, and the like. The agent, the application, or the operating system may send the data 144 to the server (e.g., the device 700) by accessing an API (e.g., the API 114 of FIG. 1) and providing the data 144 and an API key (e.g., the API key 114). The API key may indicate that the sender is authorized to send the data 144 to the server.

The server may receive the data 144 sent from each of the computing devices 102 and extract one or more events from the data 144 and store the events as one or more of the events 120. Each of the events 120 may be classified by determining how close each feature of each event is to one of the clusters 126. For example, for each of the events 120, the server may identify one or more features and determine a distance between each feature and a centroid of each of the clusters 126, as described above in FIGS. 1 and 2. The server may identify the shortest distance between one (or more) features and a particular cluster and classify the event based on the nearest particular cluster. For example, an event may be classified as normal, a security issue, a bug (e.g., software, firmware, or hardware), an anomaly, or another type of event. For some event classifications, such as normal, the server may not perform any remediation. For other event classifications, such as security issue, bug, or anomaly, the server may select and perform one or more remediation actions. For example, for a security issue, such as a compromised (e.g., stolen, hacked, spoofed, or the like) API key, the server may remediate by deactivating the API key to prevent the data from being sent or to enable the server to identify and discard data being sent by a particular agent or software application. A firmware or hardware bug may cause a software application or the operating system to create events by causing the software application or operating system to crash or generate logs. Thus, hardware and firmware bugs may show up as events generated by a software application. For a bug that is causing a large number of events to be generated, the server may remediate by instructing the agent to stop gathering data or instruct the software application to stop generating events (e.g., logs or other events). If more than a predetermined number of computing devices are generating the same (or similar) anomalous events, the particular anomaly may be re-classified as a bug. If more than a predetermined number of the same (or similar) anomalous events are generated by the same computing device, the server may select a remediation action, such as instructing the agent or software application to stop sending data or temporarily deactivating the API key. Of course, other types of remediation actions may be performed by the server, one or more of the computing devices 102, or both.

Thus, a server may receive hundreds of events per week from millions of computing devices under normal circumstances. If one (or more) computing devices send the server a large number of events in a short period of time, such that the rate at which events are being received approaches the capacity of the server to process event, then the server may determine, using machine learning, what is causing the spike in the rate of events being received and select or create a policy that throttles the events that are causing the rate increase. The server may provide the policy to computing devices that subsequently (e.g., subsequent to selecting or creating the policy) send events to the server.

The example systems and computing devices described herein are merely examples suitable for some implementations and are not intended to suggest any limitation as to the scope of use or functionality of the environments, architectures and frameworks that can implement the processes, components and features described herein. Thus, implementations herein are operational with numerous environments or architectures, and may be implemented in general purpose and special-purpose computing systems, or other devices having processing capability. Generally, any of the functions described with reference to the figures can be implemented using software, hardware (e.g., fixed logic circuitry) or a combination of these implementations. The term "module," "mechanism" or "component" as used herein generally represents software, hardware, or a combination of software and hardware that can be configured to implement prescribed functions. For instance, in the case of a software implementation, the term "module," "mechanism" or "component" can represent program code (and/or declarative-type instructions) that performs specified tasks or operations when executed on a processing device or devices (e.g., CPUs or processors). The program code can be stored in one or more computer-readable memory devices or other computer storage devices. Thus, the processes, components and modules described herein may be implemented by a computer program product.

Furthermore, this disclosure provides various example implementations, as described and as illustrated in the drawings. However, this disclosure is not limited to the implementations described and illustrated herein, but can extend to other implementations, as would be known or as would become known to those skilled in the art. Reference in the specification to "one implementation," "this implementation," "these implementations" or "some implementations" means that a particular feature, structure, or characteristic described is included in at least one implementation, and the appearances of these phrases in various places in the specification are not necessarily all referring to the same implementation.

Although the present invention has been described in connection with several embodiments, the invention is not intended to be limited to the specific forms set forth herein.

On the contrary, it is intended to cover such alternatives, modifications, and equivalents as can be reasonably included within the scope of the invention as defined by the appended claims.

What is claimed is:

1. A method comprising:
receiving, by one or more processors of a server and from a first computing device, first data identifying a first set of events that occurred on the first computing device;
receiving, by the one or more processors and from a second computing device, second data identifying a second set of events that occurred on the second computing device;
determining, by the one or more processors, an event rate at which events are being received based at least in part on:
the first set of events;
the second set of events; and
a time interval that includes a first time when the first set of events was received and a second time when the second set of events was received; and
in response to determining, by the one or more processors, that the event rate satisfies a predetermined threshold:
performing, using a machine learning algorithm executed by the one or more processors, an analysis of at least the first set of events and the second set of events;
creating, by the one or more processors and based on the analysis, a policy to reduce the event rate; and
providing, by the one or more processors, the policy to at least the first computing device and the second computing device, wherein the policy instructs the first computing device and the second computing device to throttle at least a first type of event.

2. The method of claim 1, further comprising:
receiving, from a third computing device, a request to send a third set of events that occurred on the third computing device, the request including credentials of the third computing device;
authenticating the credentials of the third computing device;
providing a token to the third computing device, the token comprising an application programming interface (API) key that indicates that the third computing device is authorized to send events to the server;
providing the token and the policy to the third computing device; and
receiving, via a call by the third computing device to a server API, a portion of the third set of events from the third computing device, the portion selected in accordance with the policy, wherein the third computing device provides the API key in the call to the server API.

3. The method of claim 2, further comprising:
determining a second event rate based at least in part on the third set of events;
determining that the second event rate satisfies a second predetermined threshold;
performing a second analysis of at least the third set of events;
selecting, based at least in part on the second predetermined threshold and the second analysis, a predetermined policy to reduce the event rate;
setting the predetermined policy as a current policy; and
providing the current policy to at least one additional computing device.

4. The method of claim 2, further comprising:
receiving a remainder of the third set of events from the third computing device after a predetermined amount of time has elapsed, the predetermined amount of time specified by the policy.

5. The method of claim 1, wherein the policy comprises:
an instruction to stop sending events associated with a particular hardware component.

6. The method of claim 1, wherein the policy comprises:
an instruction to stop sending events associated with a particular software application.

7. The method of claim 1, wherein the policy comprises:
a first instruction to:
store the first type of event in a local buffer to create buffered events; and
send the buffered events to the server at a pre-determined time interval specified by the policy;
a second instruction to stop sending a second type of event; and
a third instruction to send a third type of event having a priority higher than either the first type of event or the second type of event.

8. A server comprising:
one or more processors; and
one or more non-transitory computer readable media storing instructions executable by the one or more processors to perform operations comprising:
receiving, from a first computing device, first data identifying a first set of events that occurred on the first computing device;
receiving, from a second computing device, second data identifying a second set of events that occurred on the second computing device;
determining an event rate at which events are being received based at least in part on:
the first set of events;
the second set of events; and
a time interval that includes a first time when the first set of events was received and a second time when the second set of events was received; and
in response to determining that the event rate satisfies a predetermined threshold:
performing, using a machine learning algorithm, an analysis of at least the first set of events and the second set of events;
creating, based on the analysis, a policy to reduce the event rate; and
providing the policy to at least the first computing device and the second computing device, wherein the policy instructs the first computing device and the second computing device to throttle at least a first type of event.

9. The server of claim 8, the operations further comprising:
receiving, from a third computing device, a request to send a third set of events that occurred on the third computing device, the request including credentials of the third computing device;
authenticating the credentials of the third computing device;
providing a token to the third computing device, the token comprising an application programming interface (API) key that indicates that the third computing device is authorized to send events to the server;
providing the token and the policy to the third computing device; and
receiving, via a call by the third computing device to a server API, a portion of the third set of events from the third computing device, the portion selected in accordance with the policy, wherein the third computing device provides the API key in the call to the server API.

10. The server of claim 9, the operations further comprising:
   determining a second event rate based at least in part on the third set of events;
   determining that the second event rate satisfies a second predetermined threshold;
   performing a second analysis of at least the third set of events;
   selecting, based at least in part on the second predetermined threshold and the second analysis, a predetermined policy to reduce the event rate;
   setting the predetermined policy as a current policy; and
   providing the current policy to at least one additional computing device.

11. The server of claim 9, the operations further comprising:
   receiving a remainder of the third set of events from the third computing device after a predetermined amount of time has elapsed, the predetermined amount of time specified by the policy.

12. The server of claim 8, wherein the policy comprises: an instruction to stop sending events associated with:
   a particular hardware component; or
   a particular software application.

13. The server of claim 8, wherein the policy comprises:
   a first instruction to:
      store the first type of event in a local buffer to create buffered events; and
      send the buffered events to the server at a pre-determined time interval specified by the policy;
   a second instruction to stop sending a second type of event to the server; and
   a third instruction to send to the server a third type of event having a priority higher than either the first type of event or the second type of event.

14. One or more non-transitory computer-readable media storing instructions executable by one or more processors to perform operations comprising:
   receiving, by a server and from a first computing device, first data identifying a first set of events that occurred on the first computing device;
   receiving, from a second computing device, second data identifying a second set of events that occurred on the second computing device;
   determining an event rate at which events are being received based at least in part on:
      the first set of events;
      the second set of events; and
      a time interval that includes a first time when the first set of events was received and a second time when the second set of events was received; and
   in response to determining that the event rate satisfies a predetermined threshold:
      performing, using a machine learning algorithm, an analysis of at least the first set of events and the second set of events;
      creating, based on the analysis, a policy to reduce the event rate; and
      providing the policy to at least the first computing device and the second computing device, wherein the policy instructs the first computing device and the second computing device to throttle at least a first type of event.

15. The one or more non-transitory computer readable media of claim 14, the operations further comprising:
   receiving, from a third computing device, a request to send a third set of events that occurred on the third computing device, the request including credentials of the third computing device;
   authenticating the credentials of the third computing device;
   providing a token to the third computing device, the token comprising an application programming interface (API) key that indicates that the third computing device is authorized to send events to the server;
   providing the token and the policy to the third computing device; and
   receiving, via a call by the third computing device to a server API, a portion of the third set of events from the third computing device, the portion selected in accordance with the policy, wherein the third computing device provides the API key in the call to the server API.

16. The one or more non-transitory computer readable media of claim 15, the operations further comprising:
   determining a second event rate based at least in part on the third set of events;
   determining that the second event rate satisfies a second predetermined threshold;
   performing a second analysis of at least the third set of events;
   selecting, based at least in part on the second predetermined threshold and the second analysis, a predetermined policy to reduce the event rate;
   setting the predetermined policy as a current policy; and
   providing the current policy to at least one additional computing device.

17. The one or more non-transitory computer readable media of claim 15, the operations further comprising:
   receiving a remainder of the third set of events from the third computing device after a predetermined amount of time has elapsed, the predetermined amount of time specified by the policy.

18. The one or more non-transitory computer readable media of claim 14, wherein the policy comprises:
   an instruction to stop sending events associated with a particular hardware component.

19. The one or more non-transitory computer readable media of claim 14, wherein the policy comprises:
   an instruction to stop sending events associated with a particular software application.

20. The one or more non-transitory computer readable media of claim 14, wherein the policy comprises:
   a first instruction to:
      store the first type of event in a local buffer to create buffered events; and
      send the buffered events to the server at a pre-determined time interval specified by the policy;
   a second instruction to stop sending a second type of event; and
   a third instruction to send a third type of event having a priority higher than either the first type of event or the second type of event.

* * * * *